A. C. BOLTON.
CUTTING MACHINE.
APPLICATION FILED APR. 9, 1909.
942,164.
Patented Dec. 7, 1909.
9 SHEETS—SHEET 1.
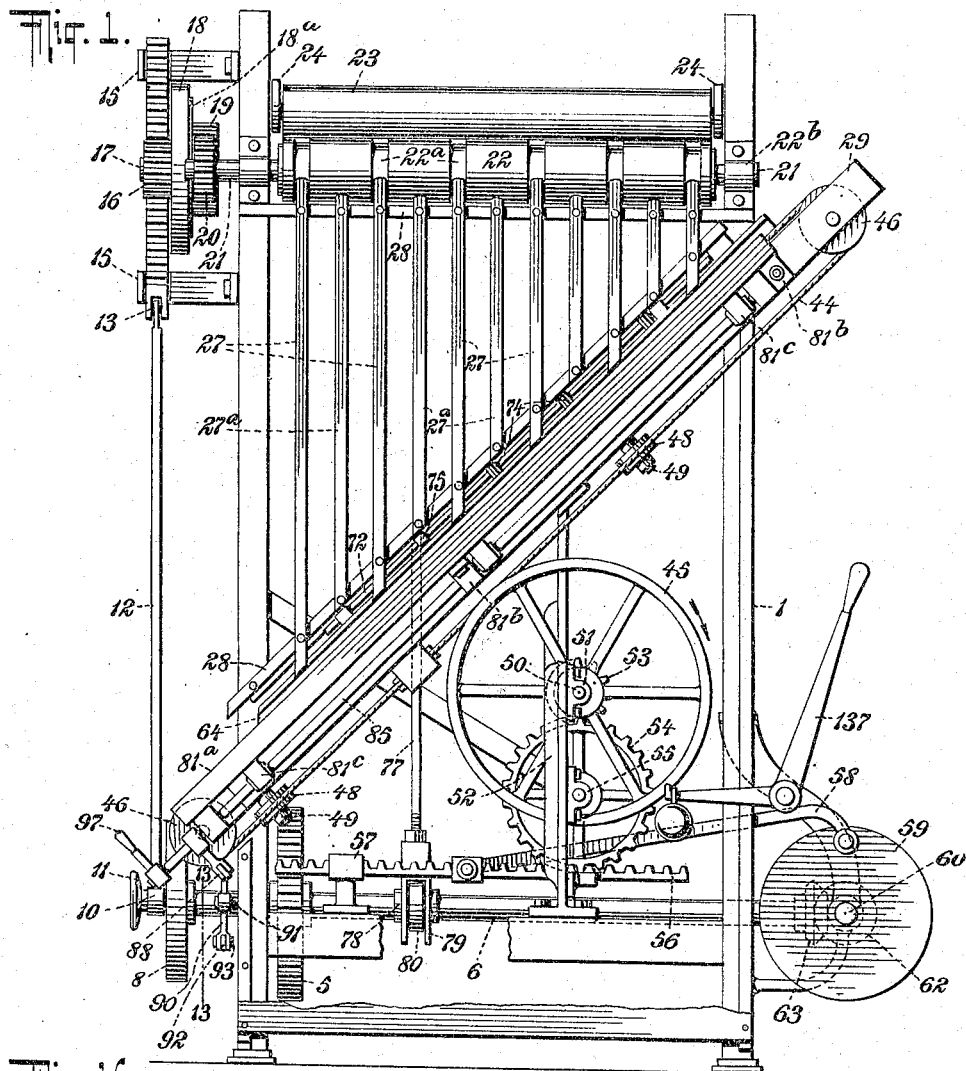
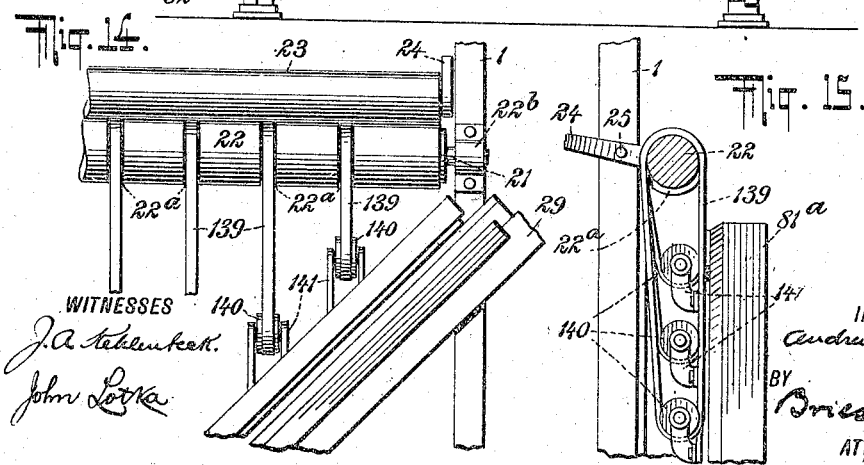
WITNESSES
INVENTOR
Andrew C. Bolton
BY
ATTORNEYS

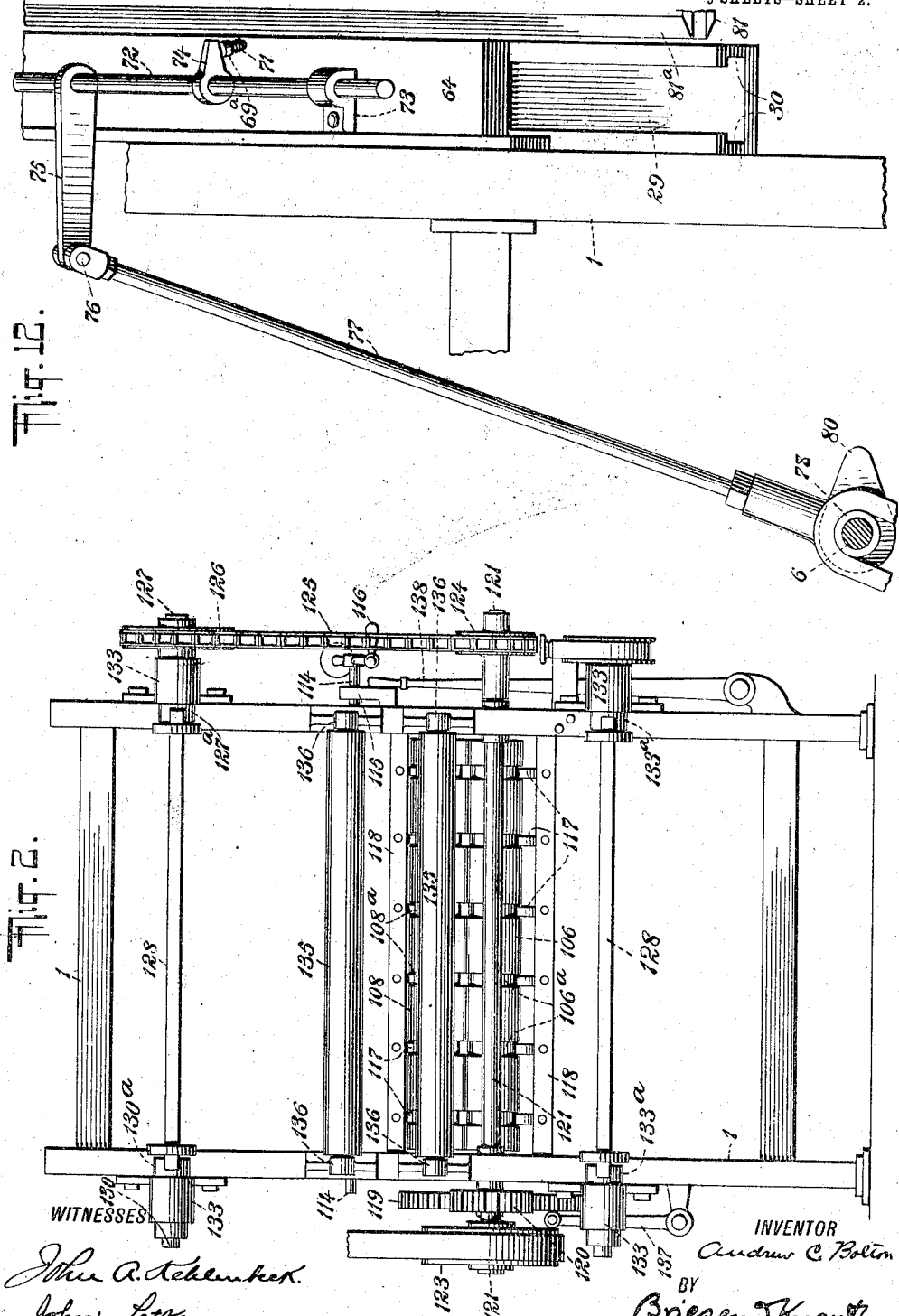

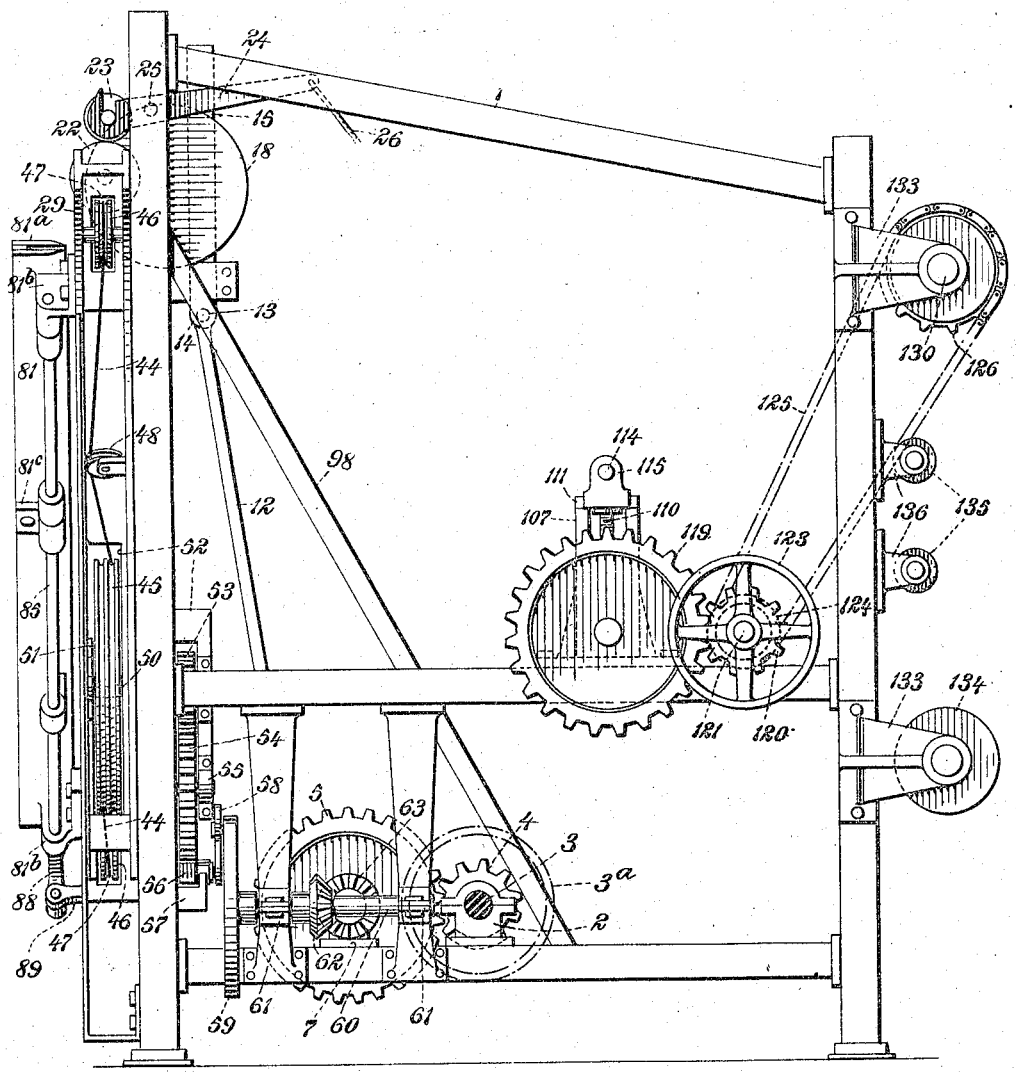

A. C. BOLTON.
CUTTING MACHINE.
APPLICATION FILED APR. 9, 1909.
942,164.
Patented Dec. 7, 1909.
9 SHEETS—SHEET 4.
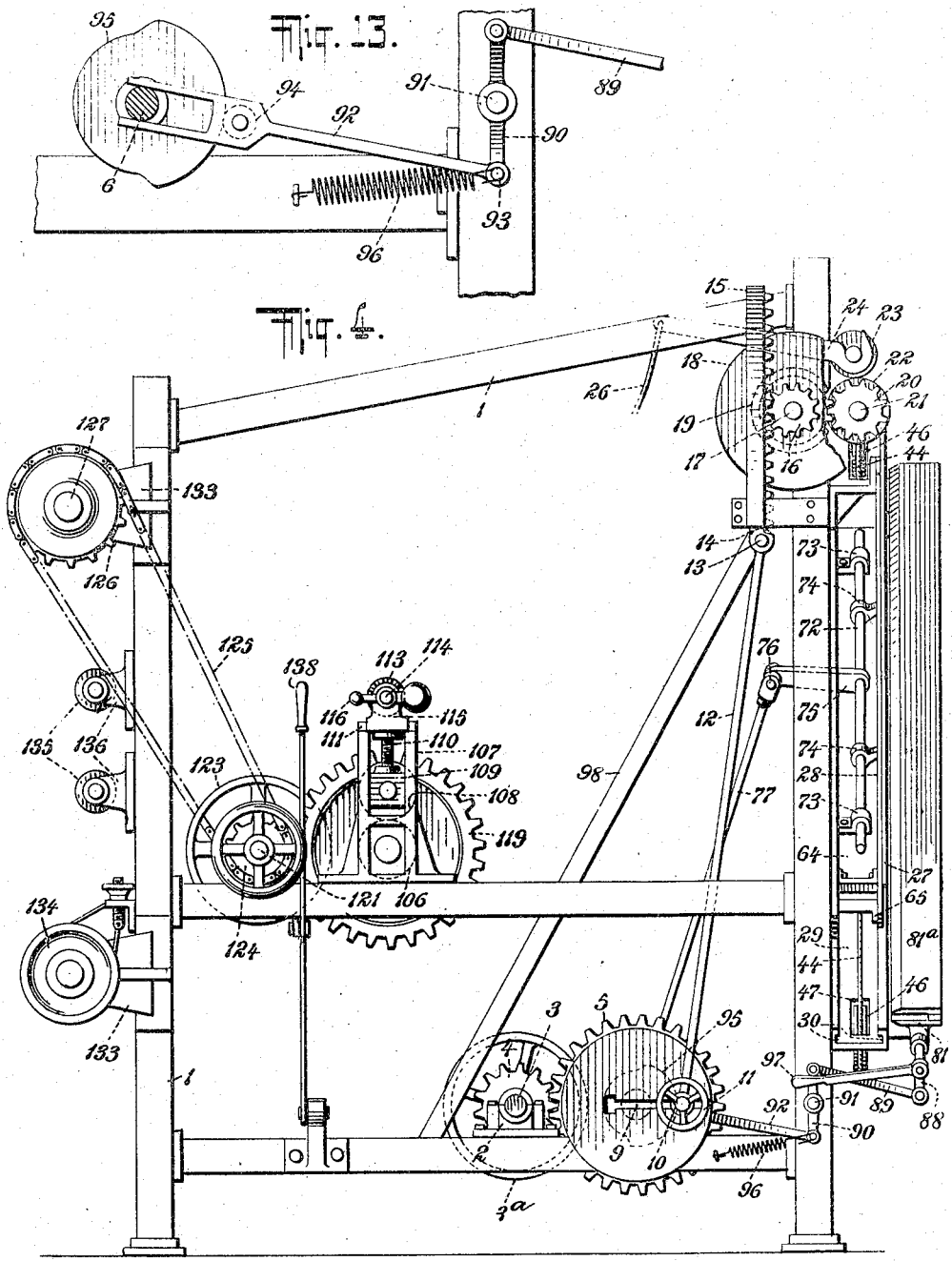
WITNESSES
INVENTOR
Andrew C. Bolton
BY
Briesen Knauth
ATTORNEYS

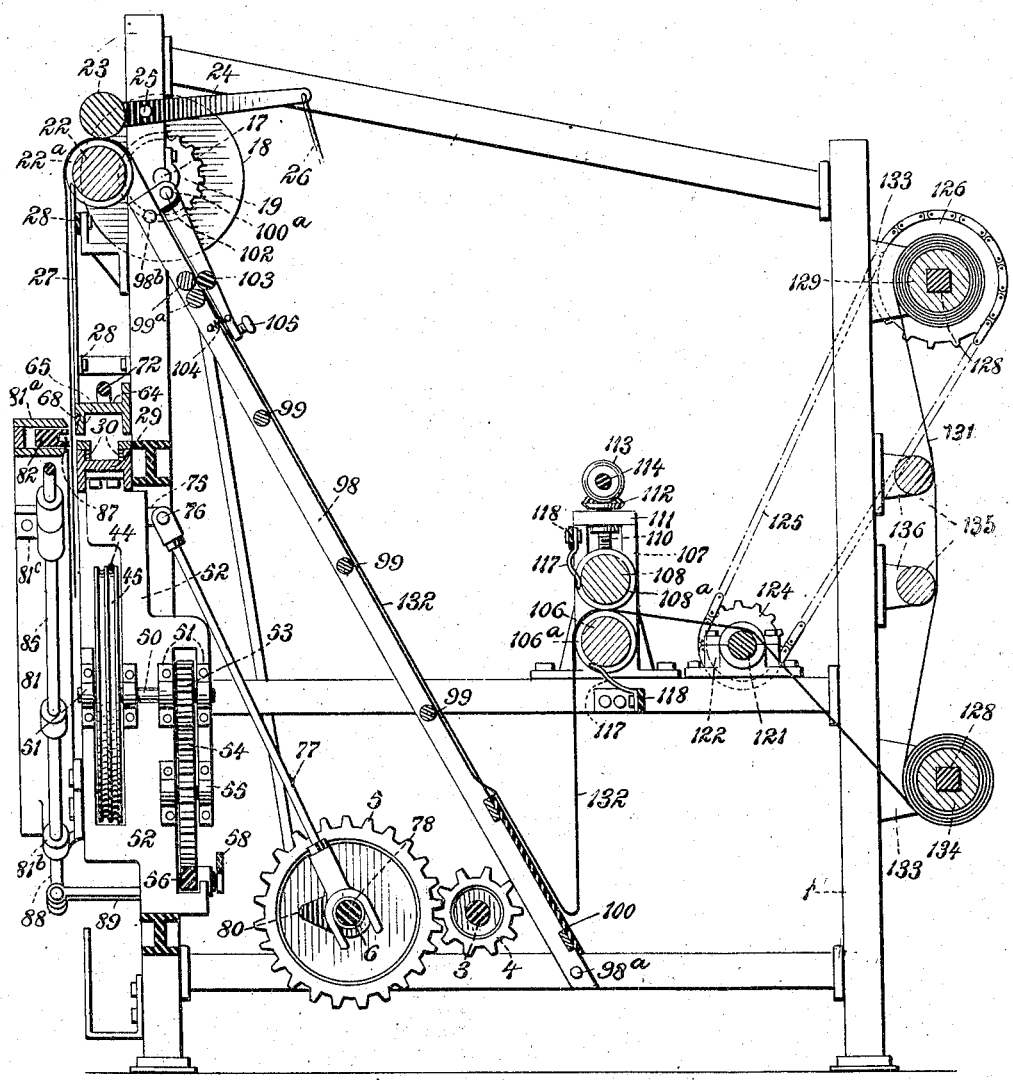

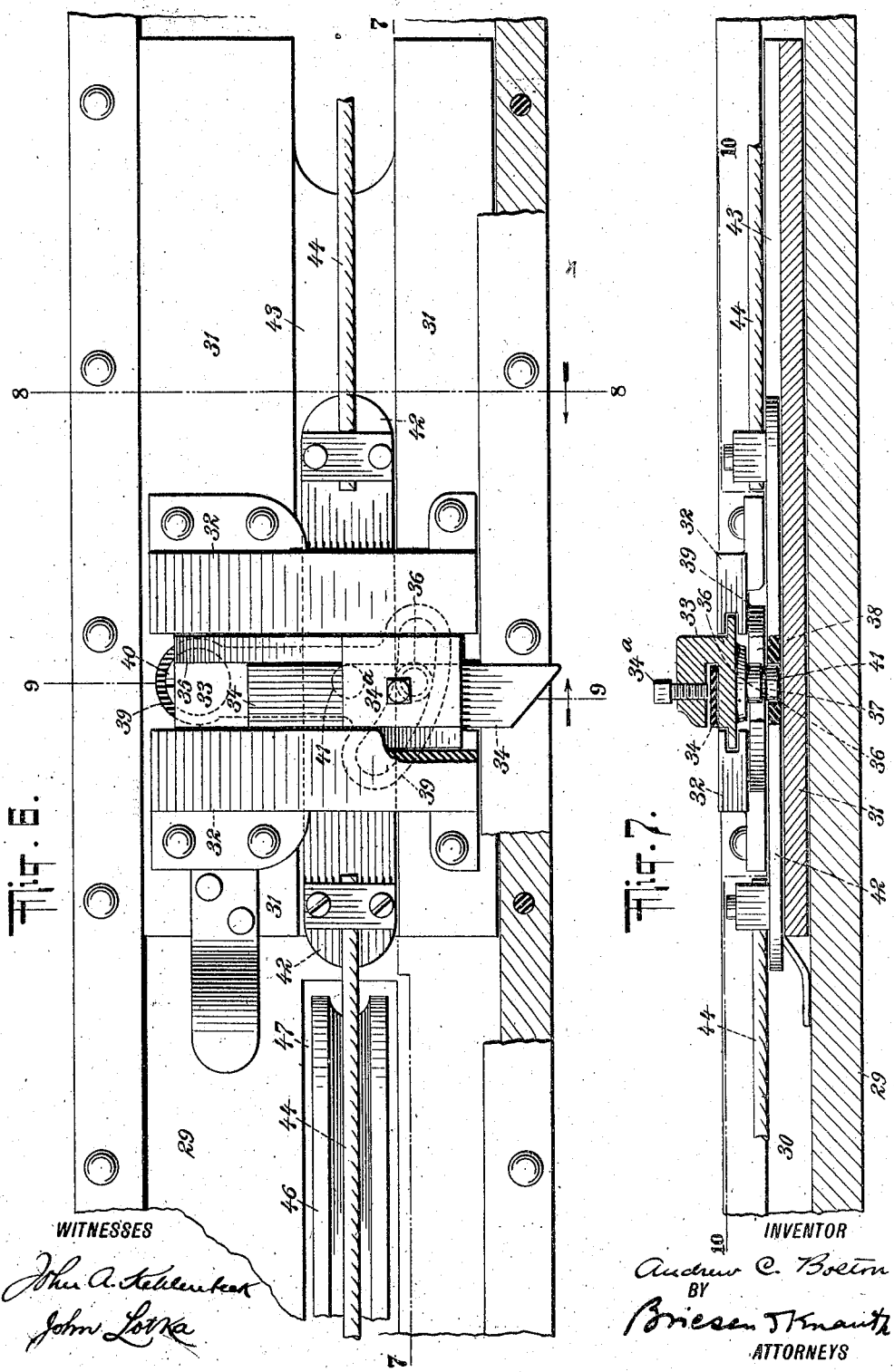

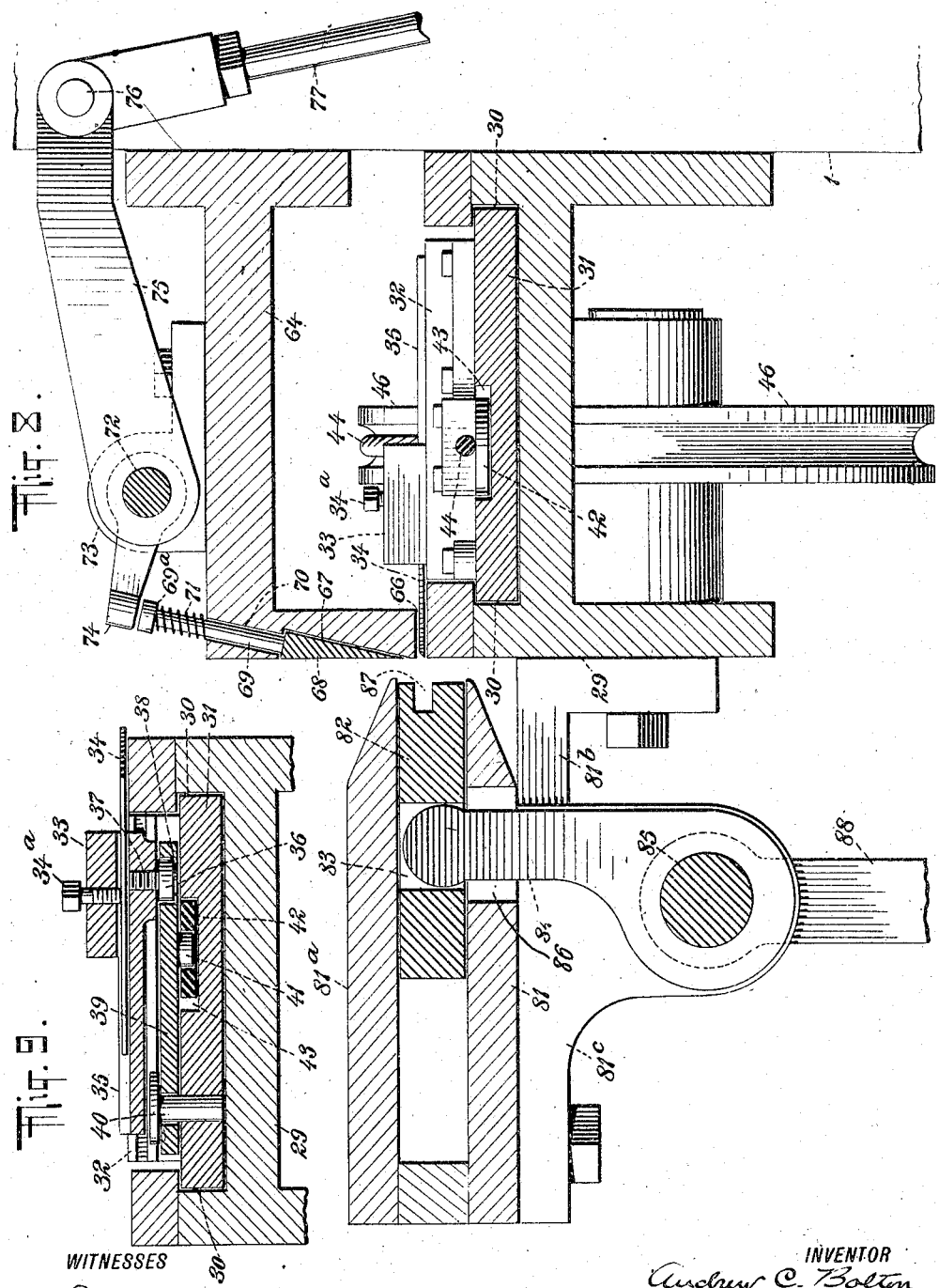

A. C. BOLTON.
CUTTING MACHINE.
APPLICATION FILED APR. 9, 1909.

942,164.

Patented Dec. 7, 1909.
9 SHEETS—SHEET 8.

WITNESSES

INVENTOR
Andrew C. Bolton
BY
Briesen & Knauth
ATTORNEYS

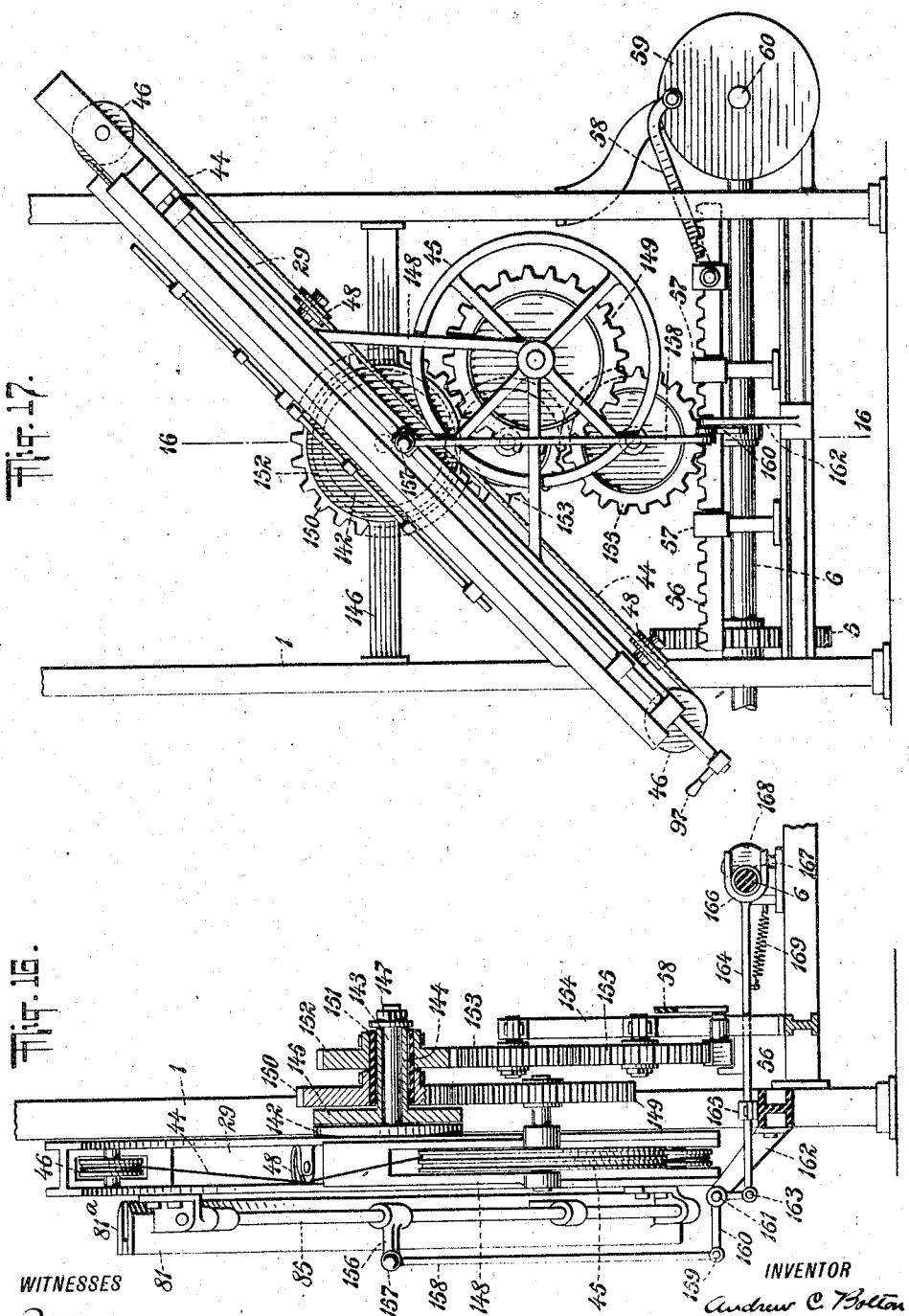

UNITED STATES PATENT OFFICE.

ANDREW C. BOLTON, OF NEW YORK, N. Y., ASSIGNOR TO GUTTA PERCHA & RUBBER MANUFACTURING COMPANY, OF NEW YORK, N. Y., A CORPORATION OF NEW YORK.

CUTTING-MACHINE.

942,164.   Specification of Letters Patent.   Patented Dec. 7, 1909.

Application filed April 9, 1909. Serial No. 488,953.

*To all whom it may concern:*

Be it known that I, ANDREW C. BOLTON, a citizen of the United States, and resident of the borough of Brooklyn, county of Kings, city and State of New York, have invented certain new and useful Improvements in Cutting-Machines, of which the following is a specification.

My invention relates to fabric cutting machines and more particularly to machines adapted for the bias cutting of duck used in the manufacture of hose and has for its object to provide a machine of this character which is positive in its operation and which can be adjusted to cut the duck into any desired lengths and at any angle.

My invention will be fully described hereinafter and the features of novelty will be pointed out in the appended claims.

Reference is to be had to the accompanying drawings in which—

Figure 10:
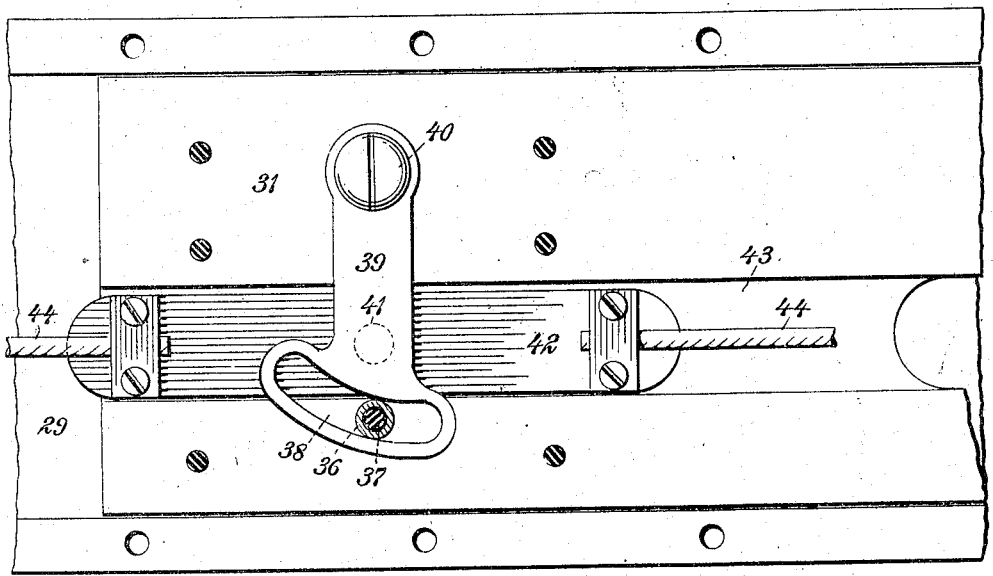
Figure 11:
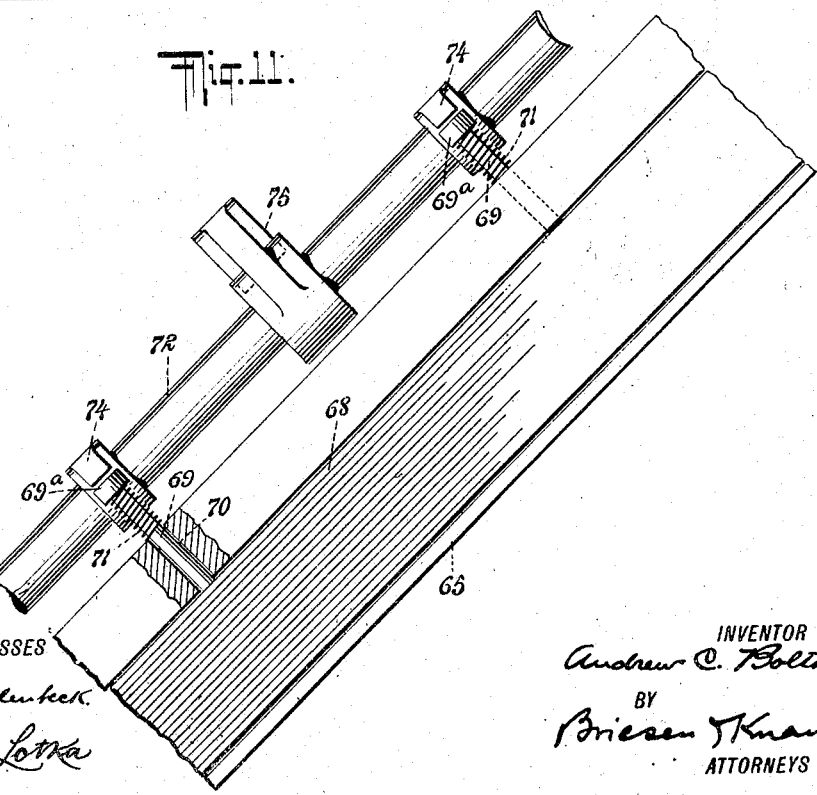

Figure 1 is a front elevation of my improved machine; Fig. 2 is a rear elevation thereof; Figs. 3 and 4 are side elevations of said machine from opposite sides; Fig. 5 is a central longitudinal section on the line 5—5 of Fig. 1; Fig. 6 is a detail enlarged plan view, partly in section, of the cutting mechanism and race; Fig. 7 is a longitudinal section thereof on the line 7—7 of Fig. 6; Fig. 8 is a cross-section on the line 8—8 of Fig. 6; Fig. 9 is a cross-section on the line 9—9 of Fig. 6; Fig. 10 is a detail horizontal section on the line 10—10 of Fig. 7; Fig. 11 is a face view of a portion of the duck releasing mechanism; Fig. 12 is an enlarged elevation thereof; Fig. 13 is an enlarged section on the line 13—13 of Fig. 1, Figs. 14 and 15 are a face view and sectional view respectively of another form of my invention; Fig. 16 is a sectional view on the line 16—16 of Fig. 17 showing an adjustable cutting mechanism and Fig. 17 is a front elevation thereof.

In the drawings 1 represents the frame of the machine on which is mounted in suitable bearings 2 a power shaft 3 driven by a belt and pulley 3ª. On this shaft 3 is secured to rotate therewith a pinion 4 which meshes with a gear wheel 5 carried by a counter shaft 6. This counter shaft 6 is journaled in bearings 7 secured to the frame 1 and carries at its one end a disk 8 provided with a radial slot 9. A block 10 is adjustable in this slot and is provided with a wheel 11 for clamping it in its adjusted position, and further has pivotally secured to it one end of an upwardly extending rod 12. The other end of this rod 12 is pivotally connected at 13 with a rack 14 vertically slidable in a stationary guide 15 secured to the frame 1. This rack 14 meshes with a pinion 16 mounted on a short shaft 17 journaled in suitable bearings secured to the frame 1. The said pinion is connected with a disk 18 to rotate therewith which disk 18 forms one member of a friction clutch, the other member 18ª of which is loosely mounted on the shaft 17 and is fastened to a second pinion 19 also loosely mounted on the said shaft 17. It is to be understood that the friction clutch just mentioned may be of any suitable kind which positively drives in one direction and in the opposite direction performs no function except that of recovery. Thus as the rack 14 is lowered the disk 18 will be coupled to the other member 18ª of the clutch and will positively rotate said member 18ª and with it the pinion 19. In the upward movement of said rack the disk will be rotated in the opposite direction without however having any effect on the member 18ª. The pinion 19 will with this means therefore be fed intermittently in one direction. As the friction clutch may be of any convenient and well known construction I have not deemed it necessary to show the said clutch in detail. The pinion 19 engages with another pinion 20 which is carried by a shaft 21 on which the one feed roller 22 is mounted, the said shaft 21 being journaled in bearings 22ᵇ suitably secured to the frame 1. The intermittent feed movement of the pinion 19 will, through the medium of the pinion 20 be communicated to the feed roller 22. A pressure roller 23 is located above the roller 22 and parallel therewith and has its opposite ends mounted in the slotted ends of lifting arms 24 pivoted at 25 on the frame 1. An operating cord 26 is secured to the free ends of these arms 24 and extends to one end of the machine and is maintained within easy reach of the operator. This pressure roller 23 operates by gravity and is intended to keep the duck in engagement with the periphery of the roller 22 and is not positively driven but is rotated by friction. By exerting a pull on the cord 26 the arms 24 will be swung on their pivots 25 and the roller 23 will be moved away from the roller 22 to permit the duck to be easily drawn between said rollers. The roller 22 is provided throughout its length with spaced annular grooves 22ª into each of which extend the ends of separate rods 27. These rods are supported on crossbars 28 secured to the frame 1 and extend downwardly adjacent to the raceway in which the cutting mechanism travels. Additional rods 27ª are located between each of the rods 27 and together with said rods serve as supports for guiding the fabric or duck to the cutting mechanism.

The raceway for the cutting mechanism comprises a guide 29 suitably secured to the frame 1 at the angle at which it is desired to cut the duck. The said guide 29 is provided with grooves 30 extending lengthwise thereof in which the sliding member 31 is adapted to travel. Lateral guiding members 32 are secured to said member 31 at a distance from and opposite to each other and serve as a guide for the block 33 which carries the knife 34. The knife 34 is adjustably secured in said block by a set screw 34ª and is held against sidewise movement by a rib 35. A roller 36 is mounted to rotate on a stud 37 which projects downwardly from the under face of the block 33 into a cam slot 38 of a cam member 39. This cam member 39 is pivoted at 40 to the sliding member 31 and is provided with a stud 41 extending downwardly into an operating slide 42 which is arranged to move in a longitudinal slot 43 of the sliding member 31. This operating slide 42 is adapted to move in the direction of its length in the raceway and has its opposite ends connected by means of a cable 44 with an operating wheel 45 as clearly shown in Fig. 1. The cable 44 passes over guide rollers 46 secured in slots 47 of the raceway and over guide rollers 48 mounted to rotate on studs 49 projecting downwardly from the said raceway. The wheel 45 is carried by a shaft 50 journaled in bearings 51 secured to an upright 52 which forms part of the frame 1. A pinion 53 is also mounted on the shaft 50 to rotate therewith and meshes with a gear 54 mounted in bearings 55 secured to the upright 52. This gear 54 engages with a horizontally movable rack 56 supported in suitable guides 57 carried by the frame 1 and connected by means of a link 58 with a disk 59. The said disk 59 is secured to a cross shaft 60 journaled in bearings 61 on the frame 1, on which shaft 60 is also mounted a bevel pinion 62 which meshes with a similar bevel pinion 63 on the counter shaft 6.

A beam 64 is arranged above the guide 29 of the raceway and parallel therewith and is secured to the frame 1 in any suitable manner as by bolts. This beam 64 is provided with a downwardly extending flange 65 having its end spaced from the said raceway so as to form therewith a longitudinal slot 66 through which the knife 34 projects when in its operative position. The flange 65 of the beam 64 is provided with a longitudinal recess having an inclined wall 67 in which is located a movable member 68 substantially triangular in cross-section. The said member 68 is formed with spaced stems 69 which extend through suitable openings 70 arranged at an angle in the beam 64 corresponding to the inclination of the wall 67. Coil springs 71 surround each stem 69 and have one end in engagement with the beam 64 and the other end seated against each head 69ª of the stems 69 and serve to maintain the member 68 in its normal position.

72 is a shaft extending lengthwise of the beam 64 and mounted in supports 73 secured to the upper surface of said beam. At points throughout its length corresponding with the location of the stems 69, the said shaft 72 is provided with fingers 74 which are secured to said shaft to move therewith and the free ends of which are located in close proximity to the heads 69ª of the stems 69. At a central point on said shaft 72 is fixed an arm 75 to the free end of which is pivotally connected at 76 one end of a rod 77. The other end of said rod 77 straddles a collar 78 on the shaft 6 and is forked as indicated at 79 to accommodate the cam 80 secured to the shaft 6, as clearly shown in Fig. 1.

A box composed of spaced beams 81 and 81ª is secured by means of braces 81ᵇ in front of the raceway for the cutting mechanism, at a distance therefrom and parallel therewith. The said box is arranged at a point opposite the slot 66 and serves as a guide box for the laterally movable clamping member 82. The said member is provided with a number of slots 83 into each of which extends the free end of a crank 84, a number of which are secured to a rock shaft 85 journaled in the brackets 81ᶜ carried by the beam 81. It is to be understood that at points opposite the slots 83, the beam 81 is provided with openings 86 through each of which projects a crank 84.

The clamping member is adapted to be moved toward and away from the cutting mechanism and has a longitudinal recess 87 formed in that edge which is adjacent to the raceway for the cutting mechanism. An arm 88 is secured near one end of the rock shaft 85 and is pivotally connected by means of a link 89 with a lever 90 fulcrumed at 91 on the frame 1 of the machine. A rod 92 is pivotally connected at 93 with the lever 90 and straddles the shaft 6 and is provided with a roller 94 arranged to engage the periphery of a cam 95 secured to the said shaft 6. A spring 96 maintains the roller 94 in engagement with said cam 95 for the purpose to be more fully described hereinafter. The shaft 85 may also be provided with a hand lever 97 for manually rocking said shaft if desired. Side bars 98 extending at an angle are secured at 98ᵃ and 98ᵇ to the frame 1 and are connected by spaced cross rods 99 and a plate 100 thus forming a support for the duck in its travel to the feed rollers 22 and 23. Near their upper ends the side bars are connected by two adjacent cross rods 99ᵃ and are further provided with lugs 100ᵃ to which arms 101 are pivoted at 102. These arms 101 are connected by means of a rod 103 which is arranged to contact with the rods 99ᵃ and to form therewith a clamping device, or a friction mechanism for preventing the duck from being pulled back. Springs 104 serve to maintain the rod 103 against the rods 99ᵃ and set screws 105 arranged near the free end of each arm 101 serve to regulate the distance between the rod 103 and the rods 99ᵃ.

106 is a feed roller extending across the machine and having its ends journaled in standards 107 on the frame 1 at opposite sides thereof. 108 is a second roller located above and parallel with the roller 106 and has its ends journaled in blocks 109 vertically adjustable in the standards 107. Screw threaded stems 110 have their lower ends secured in the blocks 109 so as to be rotatable relatively thereto and extend through fixed cross pieces 111 of the standards 107. At its upper end each stem 110 carries a bevel pinion 112 each of which meshes with a similar bevel pinion 113 secured to a shaft 114. This shaft 114 is rotatably supported in lugs 115 which form part of the standards 107 and is provided with an operating handle 116. By turning the handle 116 the shaft 114 will be rotated and with it the pinions 113 which in turn will cause the pinions 112 and stems 110 to be revolved in one direction or the other thus causing the roller 108 to be moved toward or away from the roller 106. Each roller 106 and 108 is formed throughout its length with spaced annular grooves 106ᵃ and 108ᵃ into each of which extends the end of a resilient finger 117. The fingers 117 are mounted on cross pieces 118 secured to the frame 1 and serve to dislodge the duck from the surface of said rollers 106 and 108 if the said duck should adhere thereto.

119 is a gear wheel which is secured to rotate with the roller 106 and meshes with a pinion 120 carried by a shaft 121 journaled in stationary bearings 122. A suitable belt pulley 123 is also secured to the shaft 121 to which power is applied to rotate said shaft and the feed roller 106. The shaft 121 further carries a sprocket wheel 124 which is connected by means of a sprocket chain 125 with another sprocket wheel 126 mounted on a short shaft 127 provided with a socket 127ᵃ adapted to receive the angular end of a shaft 128 on which a receiving roll 129 is mounted. A similar short shaft 130 at the other side of the frame 1 is provided with a socket 130ᵃ arranged to receive the opposite end of the shaft 128 both shafts 127 and 130 being journaled in bearings 133. This roll 129 is intended to receive the fabric 131 which is interposed between the layers of the impregnated duck 132 to prevent same from sticking together. Additional brackets or supports 133 are secured to the frame 1 in which are rotatably mounted sockets 133ᵃ adapted to removably receive the ends of the angular shaft 128 of the roll 134 on which the supply of duck 132 rolled.

135 are guide rollers mounted in brackets 136 carried by the frame 1 and serve as a medium for guiding the fabric 131 to the receiving roll 129.

Suitable operating levers 137 and 138 are provided for throwing the power belts, or suitable clutches into operative position.

In operation the roll 134 with the supply of duck 132 thereon is placed in position on the sockets 133ᵃ. The end of the duck is then carried forward over the shaft 121 and between the rolls 106 and 108, the roll 108 being in its raised position to make this easily possible. The end of the duck 132 is now brought over the rods 99ᵃ, the arms 101 and rod 103 having been swung to an inoperative position, it being understood that the springs 104 have been disconnected from said arms 101 to make this possible. The duck is now drawn over the feed roll 22, the lifting arms 24 having been swung on their pivots 25 to remove the pressure roll 23 from engagement with the roll 22. The end of the duck is further drawn downward over the roll 22 and into the space between the raceway for the cutting mechanism and the clamping member 82. The duck is now opposite the cutting path ready for the first cut and the arms 24 are released so as to permit the roll 23 to press said duck upon the roll 22 the arms 101 having also been returned to normal position. This prevents the duck from slipping back and said duck having been further drawn between the rolls 106 and 108 so as to lie flat on the cross bars 99 and place 100 and to hang downwardly from said rolls 106 and 108 as clearly shown in Fig. 5, the roll 108 is brought down into engagement with the duck on the roll 106. The fabric 131 meantime has been manually wound on the receiving roll 129. The machine is now ready to be started and the operating levers 137 and 138 having been moved to throw either the necessary clutches or to shift the power belts to operative position, the shaft 3 will be rotated and will transmit power to the shaft 6. This will cause the pinion 63 to rotate the bevel pinion 62 and with it the disk 59 thus transmitting a horizontal reciprocating movement to the rack 56 through the medium of the link 58. This reciprocation of the rack 56 will cause the operating wheel 45 to be partly rotated, the initial movement being in the direction of the arrow in Fig. 1. The lower portion of the cable 44 will be wound on the said wheel 45 and will consequently exert a downward pull on the slide 42, the cutting mechanism being in the upper portion of the groove 43. This downward pull will first move the said slide 42 relatively to the sliding member 31 and will swing the cam member 39 on its pivot through the medium of the stud 41 and owing to the shape of the cam slot 38, will move the knife 34 to the right in Fig. 6. The knife 34 is now in the cutting position and the stud 37 and roller 36 are at one end of the slot 38 so that a continued pull will draw the entire cutting mechanism downwardly in the groove 43, thus cutting the duck on a line opposite to the path of the knife. As the shaft 6 is rotated the cam 95 which is located on the said shaft 6 will actuate the roller 94 and will move the link 92 to the right in Fig. 13 thus swinging the upper end of the lever 90 to the left in said Fig. 13 and through the medium of the link 89 and crank 88 will rock the shaft 85 in a direction to cause the cranks 84 to be swung to the right in Fig. 7. This will cause the clamping member 82 to also be moved to the right in said figure against the surface of the duck which will thus be securely clamped between the member 82 and the flange 65 and the guide 29 at a point directly above and below the cutting path of the knife 34 and properly held during the cutting operation.

After the knife 34 has traveled the distance necessary to a complete cut, the direction of the wheel 45 will be reversed owing to the fact that the rack 56 will by this time be moving in the opposite direction. A pull will by this movement be exerted on the upper part of the cable 44 and the slide 42 will be given a slight relative movement in the upper direction, thus swinging the cam member 39 in the opposite direction and retracting the knife 34 out of its cutting path. The roller 36 and stud 37 are by this movement shifted to the opposite end of the slot 38 so that a continued pull will return the entire cutting mechanism to the upper portion of the groove 43 ready for the next operation. During this return movement of the said cutting mechanism the clamping member 82 will be returned to its initial position by the continued operation of the mechanism and as it is retracted between the members 81 and 81ª these members will loosen the duck from the clamping member if said duck should stick to it. At the same time as the shaft 6 continues to rotate, the cam 80 will at the proper moment raise the rod 77 and will rock the shaft 72 thus causing the fingers 74 to exert a downward pressure on the stems 69. The member 68 will therefore be lowered and owing to its inclined position will at the same time be moved to the left in Fig. 8, so that if the duck has adhered to the flange 65 or to the guide 29 the said member 68 will force the duck away and loosen it. Thus as the member 82 is retracted the member 81 and 81ª will disengage the duck from the clamping member 82 and the member 68 will free said duck from the flange 65 and guide 29 so that it is impossible for the duck to stick to the parts. By this time the disk 8 will have been rotated to a position so that a continued movement thereof will lower the rod 12 and the rack 14 and will rotate the clutch member 18 in the direction of the arrow in Fig. 4. As this is the operative movement of said clutch member 18, it will be coupled with the other member 18ª and will actuate same and with it the feed roller 22, thus advancing the duck, the end of which will be lowered by gravity into a position ready for the next cut, when the above described operation will be repeated. The distance between cuts is regulated by adjusting the block 10 in the slot 9, so that the feed roller 22 is rotated a greater or smaller distance and consequently advances the duck more or less as desired. During these operations the feed rollers 106 and 108 have been operated to feed the duck and the take up roll has been rotated to take up the fabric 131.

The knife 34 is held against accidental movement inward from its cutting position by reason of the fact that the right hand end portion of the slot 38 in Fig. 9 is made practically straight or curved about the pivot 40 so as to lock the knife in its cutting position. In other words an inward pressure on the knife will not tend to swing the member 39 on its pivot as might be the case if the slot 38 were a continuous curve struck about one center. The knife can only be withdrawn by a pull on the cable in the upward direction in the guideway for the cutting mechanism.

In the form of my invention shown in Figs. 14 and 15, I have shown spaced movable belts 139 instead of the fixed bars 27 and 27ª. These belts each pass over pulleys 140 journaled in bearings 141 secured at suitable points to stationary parts of the machine and over the roller 22 preferably in the grooves 22ª thereof. As the duck is fed along, these belts will also be actuated so that no relative movement occurs between the said belts and the duck, thus doing away with any friction or rubbing at these points. This is an important feature for the reason that the duck is impregnated with a rubber composition and in passing over the stationary bars 27 and 27ª often generates frictional electricity which causes the duck to pucker up and stick. With the form of my device just described this is impossible.

In the form of my machine shown in Figs. 16 and 17, I have shown the cutting mechanism adjustable to different inclinations so that the duck may be cut at various angles as required. To obtain this result the entire race way for the cutting mechanism is mounted on a disk 142 to which is secured an axle 143. The said axle is provided with a screw threaded end and extends through a sleeve 144 forming part of a stationary disk 145 mounted on cross bar 146 secured to the frame 1. The two disks 142 and 145 lie adjacent to each other and are clamped together by a nut 147 arranged to screw on the threaded end of the axle 143 against the end of the sleeve 144. In this form of my device the wheel 45 is journaled in a bracket 148 forming part of or secured to the raceway for the cutting mechanism to swing therewith. A gear 149 is carried by the axle of the wheel 45 and meshes with a gear 150 fastened to a collar 151 loosely mounted on the sleeve 144. This collar 151 also carries another gear 152 which engages with a gear 153 journaled on a stationary support 154 secured to the frame 1 of the machine. Axial movement of the gears 150 and 152 and collar 151 is prevented by the nut 147. The gear 153 in turn meshes with a gear 155 also mounted on the support 154 and arranged to engage with the rack 56 which is mounted to reciprocate and is actuated in the same way as in the form of my invention shown in Fig. 1 etc. To avoid the necessity for substituting different mechanism for rocking the rod 85 each time the angle of the raceway is changed, I provide the said rod 85 with an outwardly extending arm 156 located near the center of said rod in close proximity to the axle 143 instead of the arm 88. This arm 156 is connected by means of a ball and socket joint 157 with a bar 158 projecting downwardly and pivotally secured at 159 to a bell crank lever 160. The said bell crank lever 160 is fulcrumed at 161 on a stationary bracket 162 and is pivotally connected at 163 with a bar 164 horizontally movable in a bearing 165. At its free end the bar 164 is forked as indicated at 166 and straddles a collar 167 secured to the shaft 6. A cam 168 similar to the cam 95 is located in the shaft 6 and actuates the bar 164 in the same way as the cam 95 operates the bar 164. A spring 169 maintains the bar 164 in engagement with cam 168. To change the inclination of the raceway the nut 147 is loosened and the entire race way with the cutting mechanism is rotated about the axis 143 until the desired angle is secured after which the nut 147 is again screwed up to secure the said mechanism in its adjusted position. If desired and found necessary additional securing means may be provided for fastening the raceway to the side members of the frame 1. During this adjusting movement the gear 151 moves the gears 153 and 155 slightly and with them the connected mechanism without however changing the relation of said parts. Owing to the fact that the arm 156 is located near the axis about which the mechanism is adjusted the mechanism for actuating said bar is not disturbed. The members of the ball and socket joint 157 merely rotate relatively to each other during this changing of position. In this form it is therefore easy to adjust the inclination of the cutting mechanism to cut the duck at various and different angles.

My invention thus provides a machine which is simple and positive in operation and which will cut the duck into sections of the same dimensions and at the same angle.

I claim as my invention:

1. In a fabric cutting machine, a guideway, a slide adapted to travel in said guideway a knife carried by said slide and movable transversely thereto, and mechanism for first moving said knife transversely of the slide and then moving said slide and knife bodily longitudinally of the guideway in one direction or the other.

2. In a fabric cutting machine, a guideway, a knife adapted to travel longitudinally therein and means for moving said knife into or out of operative position according to the direction of travel of the knife in said guideway.

3. In a fabric cutting machine, a guideway, a slide adapted to travel in said guideway, a knife carried by said slide and movable transversely thereof, a second slide connected with said knife and movably mounted on said first named slide, and mechanism connected with said second named slide for first moving it relatively to the first named slide to shift said knife transversely and then moving both slides and knife bodily in said guide in one direction or the other.

4. In a fabric cutting machine, a guideway, a slide adapted to travel in said guideway, a knife mounted on said slide and movable transversely thereof, a cam-member pivotally carried by said slide and connected with said knife and mechanism for initially moving said cam-member to move the knife transversely and for finally moving said slide, cam-member and knife bodily in said guide-way in one direction or the other.

5. In a fabric cutting machine, a movable cutting device, a support for the fabric, a clamping member for clamping the fabric adjacent to the path of the cutting device, means for freeing the fabric from said clamping device after said fabric has been cut and mechanism for operating said cutting device.

6. In a fabric cutting machine, a movable cutting device, a support for the fabric, a clamping member for clamping the fabric adjacent the path of the cutting device, mechanism for operating said cutting device and means for disengaging said fabric from the support after said fabric has been released by the clamping member.

7. In a fabric cutting machine, a support for the fabric, mechanism for cutting said fabric, and means for disengaging the fabric from the support after the said fabric has been cut.

8. In a fabric-cutting machine, a guide way, a knife extending transversely of said guide way and movable in the direction of its own length into and out of operative position and also adapted to be bodily moved in the guide way in either position of adjustment, and mechanism for moving said knife in both directions.

9. In a fabric-cutting machine, a movable support, a knife movably carried by said support, and movable into and out of an operative position thereon and mechanism for moving said knife into or out of operative position and thereafter bodily moving said support.

10. In a fabric-cutting machine, a slotted guide way, a cutting device movable in said guide way and adapted to be projected through said slot into an operative position and to be retracted to an inoperative position, and mechanism for bodily moving said device in the guideway in a projected or retracted position according to the direction of travel.

11. In a fabric-cutting machine, a movable cutting device, a clamping member arranged to clamp the fabric adjacent to the path of the cutting device, a support in which said clamping member is arranged to move, said support being provided with means for freeing the fabric from said clamping member as the said member is released and means for operating said clamping member.

12. In a fabric-cutting machine, a movable cutting device, a support for supporting the fabric adjacent to the path of said cutting device and means carried by said support for releasing the fabric therefrom after the cutting has been completed.

13. In a fabric-cutting machine, a movable cutting mechanism, a support for supporting the fabric adjacent to the path of said cutting mechanism, and a resilient means for releasing the fabric from said support after the cut has been made.

14. In a fabric-cutting machine, a movable cutting device, a support for supporting the fabric adjacent to the path of said cutting device, means on said support movable downwardly and outwardly relatively thereto for freeing the fabric from said support after the cut has been made and mechanism for operating said means.

15. In a fabric-cutting machine, a movable cutting device, a support arranged to support the fabric adjacent to the path of said cutting device, and inclined means on said support arranged to free the fabric from said support after the cut has been made and mechanism for operating said means.

16. In a fabric-cutting machine, a movable cutting device, a support for supporting the fabric adjacent to the path of the cutting device and movable means on said support having an angular movement relatively to said support and arranged to free the fabric therefrom after the cut has been made.

17. In a fabric-cutting machine, a movable cutting device, a grooved roller for feeding the fabric to said cutting device and supports extending into the grooves to said roller for supporting the fabric in its travel to the cutting device.

In testimony whereof I have signed this specification in the presence of two subscribing witnesses.

ANDREW C. BOLTON.

Witnesses:
 JOHN A. KEHLENBECK,
 JOHN LOTKA.